UNITED STATES PATENT OFFICE.

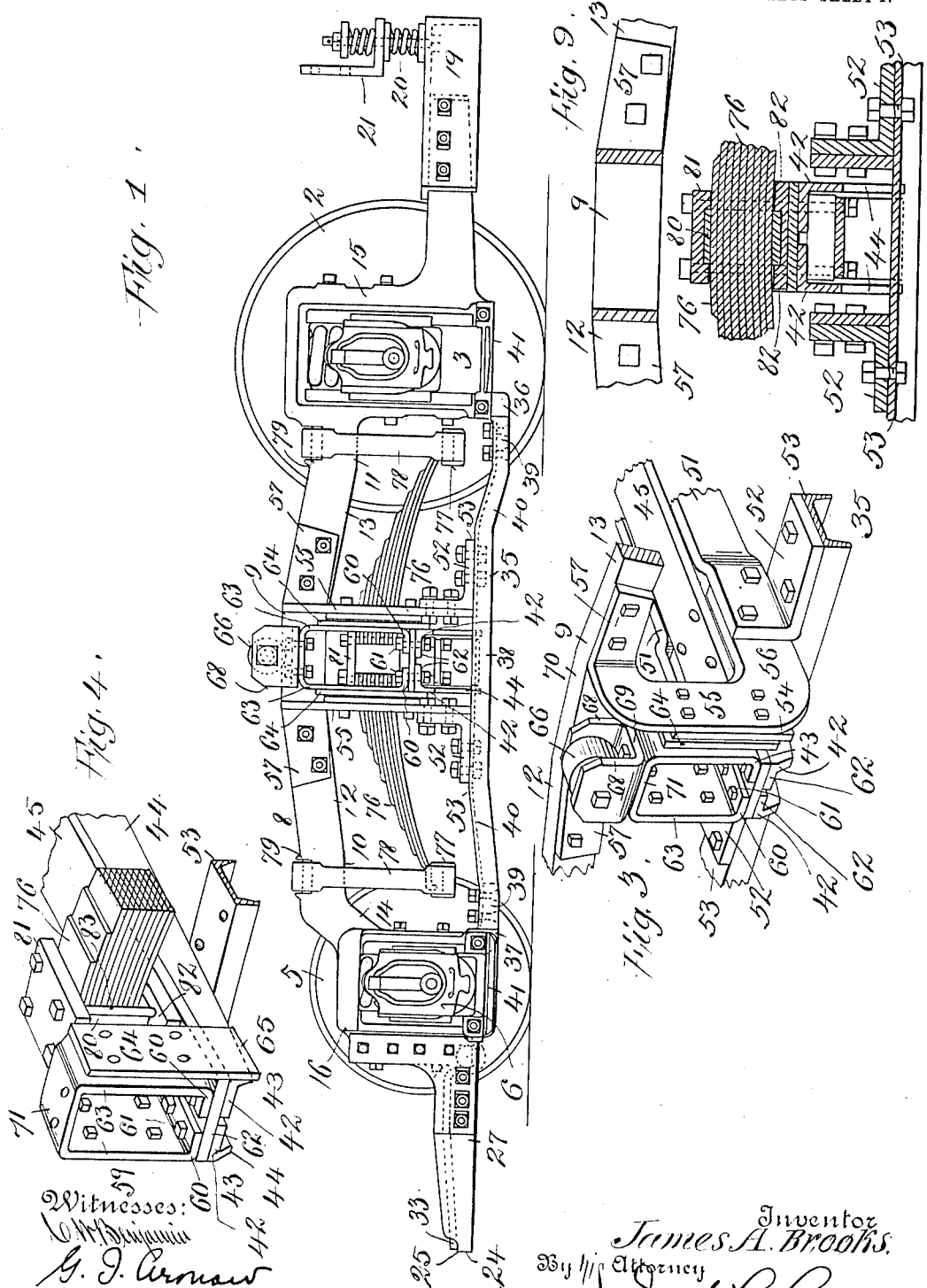

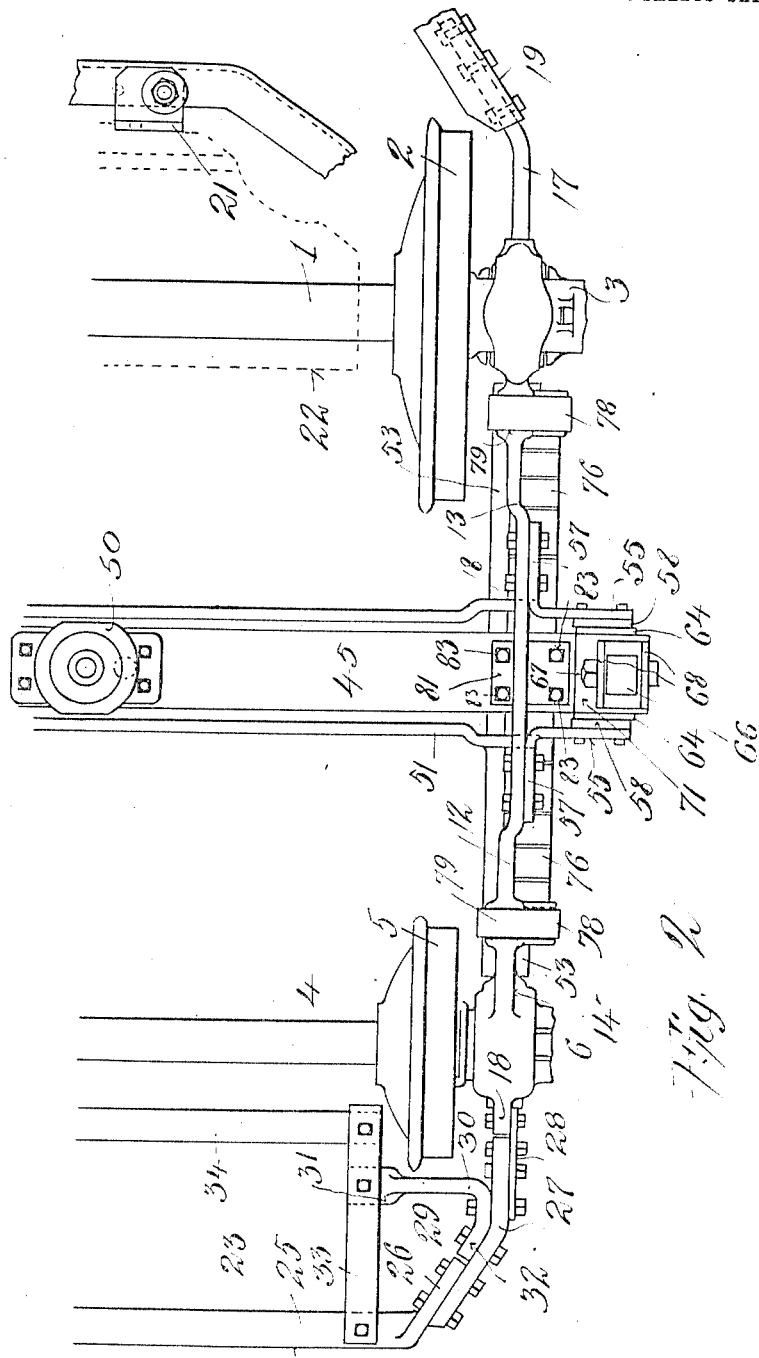

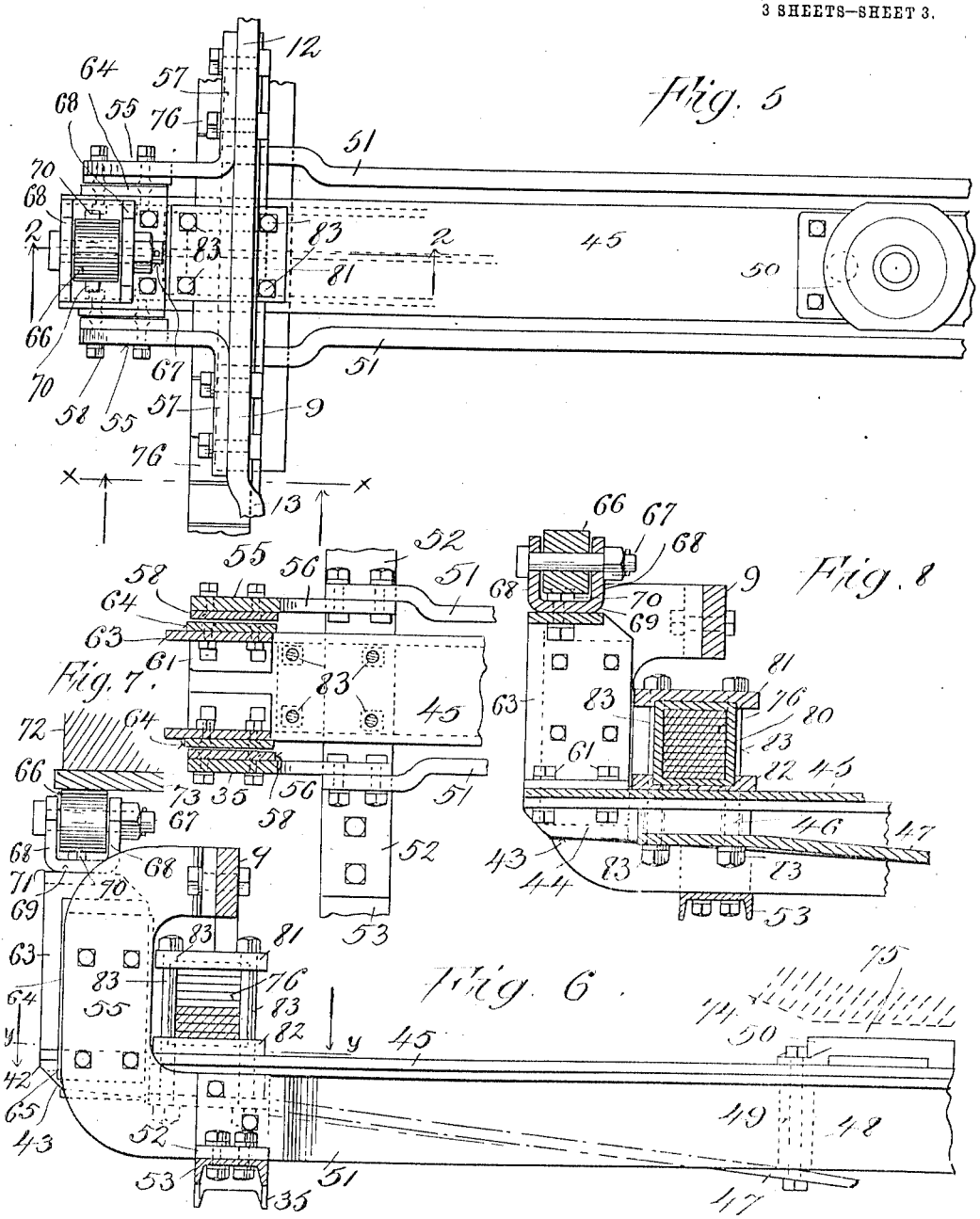

JAMES A. BROOKS, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA.

CAR-TRUCK.

1,066,790. Specification of Letters Patent. Patented July 8, 1913.

Application filed August 17, 1912. Serial No. 715,551.

*To all whom it may concern:*

Be it known that I, JAMES A. BROOKS, a citizen of the United States, residing in the city and county of Philadelphia, State of Pennsylvania, and whose post-office address is care of The J. G. Brill Co., Sixty-second street and Woodland avenue, in said city, have invented certain new and useful Improvements in Car-Trucks, of which the following is a specification.

My invention has relation to improvements in car trucks, and it has for its object among other considerations, to secure in a truck structure a low center of gravity for the superposed car body.

The improvements hereinafter described permit of the truck being readily and economically built of commercial form of metal and in a very compact form relative to its height, with the result that the truck may be employed in connection with car bodies having an entrance step located very much nearer the road-bed than usual, and as a further result of the construction the truck may be located well forward of the center of the car where the timbers are ordinarily closer together, and still have ample room for radiation under the car without impediment.

Another feature of my improvement resides in locating the bolster side bearings outside of the truck frame and providing guides for the same forming part of the truck frame, which guides are outside of the frame. This gives increased lateral stability to the support of the car on the truck.

While my improvements may in whole or in part be employed in connection with car trucks of the central pivotal type, they possess certain specific advantages when employed in connection with an eccentrically pivoted truck, and especially in that class where large and small wheels are employed and the pivot is located nearer to the larger or driving wheels than to the smaller wheels.

This truck is especially designed for the purpose of carrying a car of somewhat novel construction, wherein the entrance is at both sides of the car and centrally located, the flooring of the car being depressed below its level at the ends, the depressed portion being located very close to the ground, so as to afford a single and low placed step directly into the car body, and wherein the structure additionally requires that the smaller wheels be inside, so as to allow the car-flooring to drop near them, and the body side bearing to be on or fixed to the outer car sills. The necessities of truck construction to meet such a requirement will be readily appreciated by those skilled in the art, and the truck shown herein is specially designed to meet those requirements.

The invention, therefore, resides in the construction and combination of parts hereinafter described and more fully set forth in the claims appended hereto.

In the drawing forming part of this specification, Figure 1 is a side elevation of a car truck embodying my improvements. Fig. 2 is a plan view of the truck, partly broken away to save room in illustration, one half only being shown. Fig. 3 is a perspective view of a portion of the truck frame, and bolster, looking at an angle to the plane of the line *x—x* of Fig. 5. Fig. 4 is a perspective view of a portion of the bolster. Fig. 5 is a plan view of the portion of the truck frame, transoms and bolster. Fig. 6 is a sectional elevation of Fig. 5, certain parts being shown in section taken on the plane of the line *x—x* Fig. 5. Fig. 7 is a detail plan, partly in section, taken on the plane of the line *y—y* Fig. 6, looking in the direction of the arrow. Fig. 8 is a sectional elevation showing details of construction taken approximately on the line 2—2 Fig. 5, looking in the direction of the arrow. Fig. 9 is a further sectional elevation showing details approximately in the plane of the line *o—o* Fig. 8, looking in the direction of the arrows.

Similar reference characters indicate corresponding parts throughout the several views.

First, as to the general organization of the truck as above stated, my special improvements have been embodied in a truck of the maximum-traction type, wherein there are large or driving wheels and smaller or trailing wheels, (the latter so-called by reason that more frequently the large or driving wheels are in the lead) with a pivotal connection for the car-body located eccentrically, specifically nearer to the driving than the smaller wheels, for the purpose of increasing the proportion of the weight carried by the driving-wheels, and reducing their amplitude of radiation, and proportionally increasing the amplitude of the radiation of the smaller wheels. The purposes of such a construction are well understood in the art, but they have particular significance in connection with the present improvements on account of the availability of this type of truck in connection with a car above described in which the truck is installed under the car body in the usual way with the driving wheels leading.

At 1 are the axles for the driving wheels; 2 the driving wheels; 3 journal boxes therefor; 4 the axles for the trailing-wheels, 5, and 6 the journal-boxes therefor. The sideframes of the truck comprise the upper bars or cords, generally marked 8. Each of these cords comprise a substantially horizontal section 9 (Fig. 1) which is located approximately in the plane of the side bearings; further sections 10 and 11 also horizontally disposed and at substantially the same height; upwardly inclined sections 12, 13 and a downwardly inclined section 14. The sections 10 and 11 are disposed at a low point in order to aid in the low hanging of the bolster. The necessary height for clearance of the frame between the two sections 10, 11, is provided by means of the upwardly extending sections 12, 13. The section 11 is united to the axle-box yoke or pedestal 15 at the driving wheels, and the section 14 is united to the axle-box yoke or pedestal 16 at the trailing wheel end. Each of the pedestals have arms 17, 18 extending outwardly, the ends of the arms 17 being bent inwardly. At the driving wheel end the arms are connected transversely by an angle iron cross-bar 19 carrying a spring-support 20 for the motor, and a bracket 21 engaging the spring support which latter is adapted to be secured to the nose of the motor, 22 which is shown diagrammatically by dotted lines in Fig. 2. It is to be understood that the motor shown in dotted lines in Fig. 2, is pivotally supported upon the driving axle and extends outwardly therefrom, the freeend being secured to the motor support 21 outside of the driving wheels. At the trailing-wheel end the side frame carries a trolley or plow frame 23 consisting of a bar 24 having the section 25 disposed horizontally and an end-section 26 disposed in a vertical plane, and bolted into an inturned supplemental bar 27, the latter being secured to the pedestal extension 18, by the plate 28. At 29, is a bar having a laterally extending section 30, with a flattened end 31, and a bent section 32 conforming to the direction of the bar 27 and bolted thereto. At 33 is a flat bar secured on the horizontal section 25 of the cross-bar 24 and the flat end 31 of the bar 30, these ends being connected with another flat bar 34, located within the plane of the wheels but clearing the same and extending parallel to the flat section 25 of the bar 24. Both sides of the plow frame are constructed alike. In this manner an efficient plow or trolley frame is constructed of commercial forms of metal. This plowframe, extending outside of the trailing wheels, tends to balance the truck, and coextensively aids in keeping the trailing wheels on the track.

The lower cord of the truck frame comprises the inverted channel beam generally marked 35; secured at its ends to extensions 36, 37 from the frame pedestals or yokes, comprising an elevated intermediate section 38, depressed end sections, 39, and connecting and upwardly extending sections 40, this disposal aiding in the low placing of the truck bolster, the ends of the yokes or pedestals being connected by cross-bars 41 in the usual manner.

The bolster comprises two opposed angleirons 42 (Fig. 9) spaced apart to form a channel, the outer ends 43 of the pendent webs 44 being narrowed. These parts are made long enough so that they will extend out beyond the side-frames of the truck car springs as hereinafter described. On top of the horizontal webs is laid a flat plate 45. At suitable points, which for reasons hereinafter described are located in the plane of the truck springs, are placed blocks 46, and between these blocks extend a truss plate, 47, the distance between the ends of the truss plate and the ends of the angle-irons being reduced in order to allow the bolster to clear the lower-cord 35 the intermediate section being widened for strengthening purposes, and to which is secured the thimbles 48, shown in dotted lines in Fig. 6, through which pass bolts 49, tying the elements of the bolster together at this point, and serving to secure the truck center-bearing 50 on the top bolster plate.

The transoms, which form an important part of my improvements, performs the usual function of guiding the bolster and operatively connecting it with the car truck for propulsion, etc., but by the extensions of the same outside of the wheel gage, and, specifically, as in this case outside of the truck frame, affords a guide for the extended ends of the bolster and constitutes means for connecting the top and bottom cords of the side frames, forming a framepedestal for the bolster. To mechanically produce this structure, I provide two flat bars 51 set with their faces apart, which, at their ends, are provided with horizontally disposed extensions 52 secured to the horizontal web 53 of the lower cord, as clearly shown in Figs. 3 and 7. At 54 are two U-shaped bars comprising vertical sections 55, the lower horizontally and transversely extending section 56, and the upper longitudinally extending section 57. The latter is secured face-on to the side of the upper-cord 8 (sections 12, 13) and the lower sections face-on to the side-face of the end of the bars 51; the upright sections being spaced sufficiently apart to allow the end of the bolster and the side bearing saddle, to be hereinafter described, to be installed therebetween and to operate. To each of the upright sections of the bars, which constitute frame pedestals, are secured wear plates 58.

Upon the ends of the upper bolster-plate 45 are secured the side bearing saddles 59 comprising a flat bar bent to rectangular shape, its lower inturned ends 60 being secured on the bolster top-plate 45 by bolts 61 which pass through said inturned ends, the bolster top plate and the horizontal webs 62 of the bolster angle-irons, thereby firmly securing all of the parts together at the ends. To the side or upright webs 63 of the saddles are secured bolster wear-plates 64, the lower ends 65 of which extend down and cover the edge of the bolster top-plate and the upright web of the bolster angle irons, as shown in Fig. 4. The side bearing in this particular embodiment of my improvements consists of a roller 66 mounted on a bolt 67 the bolt passing through upright arms 68 of an inverted U shaped carrier, formed by bending a piece of flat metal, the lower web 69 of which is secured by bolts 70 to the top web or section 71 of the side bearing saddle.

In the construction and assemblage of the transom, bolster, frame, pedestal and side bearing elements but few castings have been employed, the greatest portion of the parts being made up from commercial forms of metal which can be kept readily at hand and conformed to the desired shape by bending in any of the well-known ways, thereby rendering the truck, so far as these features are concerned, very economical as to cost and providing means for its expeditious construction. In a truck of this kind it is important to have an extended spring base or support for the bolster. It is also important to leave the truck space between the side frames and the wheels and axles as free as possible. By reference to Fig. 6 is will be seen that the side-bearings are above the plane of the side-bars, whereas the truck center-bearing is located at a suitable distance below the plane of the side bearings, very much below the side bars, and substantially in line with the truck springs. All these elements enable the implacemnt of a car body of the type above described so that it can fit well down into the truck, and have a center of gravity well within the plane of the wheels and, in fact, substantially in line with the axle, the outside location of the side bearing enabling the car body bearings or rub plates to be located on the underside of the outer-sills 72 and either within or outside of their outer faces if desired, as shown in Fig. 6, (where a portion of the outer sill 72 carrying a body rub-plate 73 and a portion of the body bolster 74 and the body center bearing 75 is diagrammatically illustrated) the location of the side bearings outside of the wheel gage and side frames, in addition to their elevated position relative to the center-bearing, giving the car mounted on the truck great lateral stability.

While my improvements do not contemplate any specific kind of truck springs or means for supporting them, I prefer the semi-elliptic spring form and the means for hanging them, as shown. Such form allows of the accomplishment of many of the results herein described. At 76 are the truck-springs, comprising upwardly arched semi-elliptic springs disposed longitudinally between the upper and lower cords. The ends of these springs bear on blocks which are seated in the lower ends of strap-hangers 78, the upper ends of which are seated in bearings 79 formed in the upper edge of the top cord, the bearings being at the horizontal sections 10 and 11 of the top cord, near the pedestals, the hangers straddling or embracing the top cords.

The top bolster plate does not rest on the springs but is hung from them. This feature also enters into the low placing of the center bearing. The springs 76 are provided with bands 80. These bands at the top carry recessed plates 81 and at the bottom are seated in recessed plates 82. Bolts 83 pass through the recessed plates, through the top bolster plate, the blocks 46, and the lower bolster plate 47, thereby firmly securing the springs and bolster together, additionally uniting the bolster plates together at their ends, and hanging the bolster from the springs. The bearings for the hangers permit the bolster and springs to swing bodily transversely of the truck, the ends of the bolster being guided by the wear-plates 58, 64 on the side-bearing saddles and frame pedestal, which also guide the bolster in its up and down movements on the springs, the ends of the bolster being sufficiently above the lower cord to provide clearance.

While I prefer the method of constructing the truck as shown and described herein, my improvements may be otherwise embodied without departing from the spirit of my invention.

Having described my invention, I claim:

1. In a car truck the combination of a frame, large driving wheels and smaller trailing wheels, a pivot located nearer the driving wheels than the trailing wheels, frame extensions beyond both wheels, a motor secured to the axle of the driving wheels, its free end supported upon the frame extension at that end, and a plow frame secured to the frame extensions outside of the trailing wheels.

2. In a car truck the combination of a frame, longitudinally extending, semi-elliptic springs hung from said frame and a truck bolster secured to and under said springs.

3. In a car truck, the combination with a frame, longitudinally extending semi-elliptic springs hung from said frame, the bolster and spring being secured together so that the bolster hangs from the spring, bolster end-extensions located outside of said spring, side bearings mounted on said extensions, and means on the truck frame for guiding said side bearing supports.

4. In a car truck the combination with the side frames, the longitudinally disposed semi-elliptic springs hung from the side frames, a bolster secured to and under the said springs and having ends extending out beyond said springs, bearing saddles on said ends, means on the side frames for guiding said saddles, side bearings on said saddles and a center bearing on said bolster, the side bearings being above the plane of the center bearing.

5. In a car truck the combination of side frames, wheels and axles, side frames having a top-cord, a bolster, means for supporting the bolster on the side frames, side bearings mounted on the bolster above the plane of the top cords, and a center bearing mounted on the bolster below the plane of the top cords.

6. In a car truck the combination of wheels and axles and side frames, the side frames having top cords, a bolster supported from said top cords the ends of which extend out beyond the side frames, side bearings mounted above the plane of the top cords, supports extending between the side bearings and the bolster ends, guides for said support secured to the outside of the side frames, and a truck center bearing or pivot located on the bolster below the plane of the side bearings.

7. In a car truck, the combination with a truck frame, driving wheels and smaller trailing wheels, a truck bolster spring-supported on the truck frame at a point nearer the driving than the trailing wheels, side bearings carried by the bolster, the center bearing being located below the plane of the side bearings.

8. In a car truck the combination with a truck frame, large driving wheels and smaller trailing wheels, a bolster spring supported from the truck frame having ends extending out beyond the side frames and located nearer the driving than the trailing wheels, elevated side bearings supported by the bolster ends outside of the truck frame, and a center bearing supported on the bolster on a plane relatively depressed below the side bearings.

9. In a car truck the combination with a truck frame, larger driving wheels and smaller trailing wheels, a truck bolster spring supported from the truck frame and located nearer the driving than the trailing wheels and having ends extending beyond the side frames, elevated supports on the bolster ends outside of the truck frame, side bearings on said supports, guides on the outside of the truck frames adapted to engage the bolster ends and side bearing supports, and a center bearing on the bolster depressed relatively to the side bearings.

10. In a car truck the combination of the side frame having upper and lower cords, transoms comprising paired elements extending between the lower cords, and frame pedestals extending between the upper and lower cords and constituting extensions of the transoms.

11. In a car truck, the side frames comprising upper and lower cords and bars having transverse bearing faces spaced apart, extending outwardly beyond the plane of the cords, and secured respectively to the upper and lower cords.

12. In a car truck frame pedestals consisting of the upper and lower cords, and bars having upper horizontal ends secured to the top cord and lower transverse ends secured to the lower cord.

13. In a car truck, a frame pedestal comprising the truck frame, upper and lower cords, the bars 54 having upper ends 57 extending longitudinally and secured to the top cord, lower ends 56 extending transversely and secured to the lower cord, upright parts 55 extending outwardly from the said cords, and wear plates 58 on the opposite faces of the said upright parts.

14. In a car truck having side frames comprising upper and lower cords, transom bars extending between the lower cords and having ends secured to the lower cords, and the bars 54 comprising the upright sections 55 extending outwardly from the said cords, the ends 57 extending longitudinally and secured to the top cord, and the lower ends 56 extending transversely and secured to the ends of the transom bars.

15. In a car truck the combination with a bolster having a top-plate 45, a leaf-spring having a band 80, and means for securing the spring and band on the bolster comprising a lower recessed plate 82, resting on the plate 45, a top recessed plate 83, the said band and spring being received by said recessed plates, and bolts passing through said recessed plates and a bolster plate 45 for securing the stated parts together.

16. In a car truck the combination of the side frames, the outside pedestals, a bolster extending between said pedestals, side bearing saddles on the bolster ends within the frame pedestal, and side bearings on said saddles.

17. In a car truck, side bearing saddles comprising a bar bent to form lower inturned ends, upright sides, and top web, a bolster and means for securing the inturned ends to the bolster.

18. In a car truck a combination, with the bolster comprising a top plate and angle irons with depending webs, the side bearing saddle, and wear plates secured to the side bearing saddle and extending therebetween and the depending webs and the angle irons.

19. In a car truck the combination with a bolster, the side bearing saddles having upright parts, wear plates on the side of the side bearing saddles, upper and lower cords, bars extending outwardly from the side frames and secured to the said cords, and wear plates on the upright sections of said bars adapted to engage the wear plates on the side bearing saddles.

20. In a car truck the combination with a bolster, the side bearing saddles thereon, a side bearing comprising a roller, and a support for the same comprising an inverted U-shaped bar forming a channel within which the roller lies having upwardly extending ends and receiving a bolt for supporting the roller, and means for securing the horizontal web of said bar to the side bearing saddle.

21. A side frame for a car truck comprising the horizontal sections 11, elevated section 9, downwardly inclined sections 12, 13, abruptly inclined sections 14, and pedestals 15, 16.

22. In a car truck the combination with the side frames having extensions, a plow frame comprising the parallel bars 24, 34, the longitudinal bars 33, connecting vertical bars, the bar 28, the supplemental bars 27 having bent ends secured to the frame extensions, and a stay bar 30 having bent ends 32 secured to the bar 27 and a flattened end 31 secured to the bars 33.

23. In a car truck the combination with the side frames having yoke extensions, and a plow frame comprising parallel bars 24, 34, the longitudinal bars 33, the supplemental bars 27, the transverse bar 24 having bent ends 26 secured to the supplemental bars, the stay bars 30 secured to the longitudinal bars 33 and the supplemental bars 27, and additional bars securing the supplemental bars with the frame extensions.

Signed in the city and county of Philadelphia, and State of Pennsylvania this 15th day of August, 1912.

JAMES A. BROOKS.

Witnesses:
H. F. McKILLIP,
HENRY C. ESLING.